(12) United States Patent
Hirose et al.

(10) Patent No.: US 11,125,342 B2
(45) Date of Patent: Sep. 21, 2021

(54) SPOOL VALVE

(71) Applicant: CKD CORPORATION, Aichi (JP)

(72) Inventors: Yasuhisa Hirose, Aichi (JP); Takahiro Minatani, Aichi (JP); Keiichi Nishikawa, Aichi (JP); Yoshinori Tanaka, Aichi (JP); Naofumi Yoshida, Aichi (JP)

(73) Assignee: CKD CORPORATION, Aichi (JP)

( * ) Notice: Subject to any disclaimer, the term of this patent is extended or adjusted under 35 U.S.C. 154(b) by 6 days.

(21) Appl. No.: 16/722,678

(22) Filed: Dec. 20, 2019

(65) Prior Publication Data

US 2020/0208745 A1 Jul. 2, 2020

(30) Foreign Application Priority Data

Dec. 28, 2018 (JP) .............................. JP2018-247218

(51) Int. Cl.

| F16K 3/34  | (2006.01) |
| F16K 11/07 | (2006.01) |
| F16K 3/26  | (2006.01) |
| F16K 27/00 | (2006.01) |

(52) U.S. Cl.
CPC ............... *F16K 3/34* (2013.01); *F16K 3/26* (2013.01); *F16K 11/0712* (2013.01); *F16K 27/003* (2013.01); *Y10T 137/87981* (2015.04)

(58) Field of Classification Search
CPC .......... F16K 3/34; F16K 3/26; F16K 11/0712; Y10T 137/87981
See application file for complete search history.

(56) References Cited

U.S. PATENT DOCUMENTS

| 1,704,759 | A  | * | 3/1929  | Miller   | F16K 11/0712 |
|           |    |   |         |          | 251/324      |
| 3,922,955 | A  | * | 12/1975 | Kast     | F15B 11/128  |
|           |    |   |         |          | 91/461       |
| 4,664,152 | A  | * | 5/1987  | O'Mara   | F15B 13/04   |
|           |    |   |         |          | 137/454.2    |
| 6,554,014 | B2 | * | 4/2003  | Beyrak   | F16K 3/26    |
|           |    |   |         |          | 137/1        |
| 7,322,375 | B2 | * | 1/2008  | Goldfarb | F16K 11/085  |
|           |    |   |         |          | 137/625.22   |
| 7,766,041 | B2 | * | 8/2010  | Tackes   | F16K 31/0613 |
|           |    |   |         |          | 137/625.3    |
| 8,479,769 | B2 | * | 7/2013  | Rub      | F15B 13/0418 |
|           |    |   |         |          | 137/596.16   |

FOREIGN PATENT DOCUMENTS

JP 5893419 B2 3/2016

* cited by examiner

*Primary Examiner* — Kevin R Barss
(74) *Attorney, Agent, or Firm* — Osha Bergman Watanabe & Burton LLP

(57) ABSTRACT

A spool valve includes: a cylindrical tubular sleeve that extends in an axial direction and comprises a first port and a second port separated from each other in the axial direction, and a cylindrical columnar spool that extends in the axial direction and comprises a diameter reduced portion. The cylindrical columnar spool moves in the axial direction through the sleeve and opens and closes the first port to cause the first port to or not to communicate with the second port, and the first port has a first through hole having a first width in a circumferential direction of the sleeve, and a second through hole having a second width different from the first width in the circumferential direction.

17 Claims, 11 Drawing Sheets

SPOOL VALVE

CROSS REFERENCE TO RELATED APPLICATION

The present application claims priority to Japanese Patent Application No. 2018-247218 filed on Dec. 28, 2018, the entire content of which is incorporated by reference.

BACKGROUND

Technical Field

The present invention relates to a spool valve for controlling the flow rate of fluid.

Description of the Related Art

A conventional spool valve includes a cylindrical tubular sleeve having a plurality of ports formed therein, and a cylindrical columnar spool which opens and closes the ports by moving in an axial direction within the sleeve (see Japanese Patent No. 5893419). In the spool valve disclosed in Japanese Patent No. 5893419, a sloping portion for gradually changing the diameter of the spool in the axial direction is formed at an end of each closing portion of the spool for closing a corresponding one of the ports. The shape of the sloping portion is adjusted so as to establish a desired relation between the amount of axial movement of the spool and the amount of increase in the flow rate of fluid (to attain a desired flow rate gradient).

Incidentally, in the case of the spool valve disclosed in Japanese Patent No. 5893419, the sloping portion of the spool must be machined with high accuracy. Therefore, the degree of difficulty in manufacturing the spool valve unavoidably increases.

SUMMARY

One or more embodiments of the present invention provide a spool valve which allows flexible setting of the relation between the amount of axial movement of the spool and the amount of increase in the flow rate of fluid and which can prevent an increase in the degree of difficulty in manufacturing the spool valve.

A spool valve according to one or more embodiments comprises a cylindrical tubular sleeve extending in an axial direction and having a first port and a second port separated from each other in the axial direction, and a cylindrical columnar spool extending in the axial direction and having a diameter reduced portion. The spool moves in the axial direction within the sleeve so as to open and close the first port, thereby establishing communication between the first port and the second port and cutting off the communication. The first port has a first through portion which is a through hole having a first width in a circumferential direction of the sleeve, and a second through portion which is a through hole having a second width different from the first width in the circumferential direction of the sleeve.

In the above-described structure of one or more embodiments, the sleeve has a cylindrical tubular shape and extends in the axial direction. The first port and the second port are formed in the sleeve such that the first port and the second port are separated from each other in the axial direction. The spool has a cylindrical columnar shape, extends in the axial direction, and has a diameter reduced portion. The spool moves in the axial direction within the sleeve so as to open and close the first port. As a result, communication between the first port and the second port is established and is cut off. Therefore, the flow rate of fluid flowing between the first port and the second port can be controlled by adjusting the open area of the first port by the spool.

The first port of one or more embodiments includes the first through portion which is a through hole having a first width in the circumferential direction of the sleeve, and the second through portion which is a through hole having a second width different from the first width in the circumferential direction of the sleeve. Therefore, in accordance with the movement amount of the spool in the axial direction, various states can be realized, for example, a state in which the second through portion is closed and the first through portion is partially or fully opened, a state in which the first through portion is fully opened and the second through portion is partially opened, and a state in which the first through portion is fully opened and the second through portion is fully opened (other states may also exist). The relation between the axial movement amount of the spool and the amount of increase in the flow rate of the fluid (the gradient of the flow rate) differs among these states. Therefore, the relation between the axial movement amount of the spool and the amount of increase in the flow rate of the fluid can be flexibly set by adjusting the positions of the first and second through portions in the axial direction and adjusting the first and second widths. Notably, the positions of the first and second through portions in the axial direction are defined by respective distances between the second port and ends of the first and second through portions on the second port side.

Since the first and second through portions are through holes, these through portions can be easily formed by means of hole machining such as drilling. Also, since the relation between the movement amount of the spool and the amount of increase in the flow rate of the fluid can be set by adjusting the positions of the first and second through portions in the axial direction and adjusting the first and second widths, it is unnecessary to form a sloping portion on the spool as in the case of the conventional spool valve described in the related art section. Accordingly, it is possible to prevent an increase in the degree of difficulty in manufacturing the spool valve.

According to one or more embodiments, the first through portion is a circular hole or an elongated circular hole which has a first diameter, as the first width, in the circumferential direction of the sleeve, and the second through portion is a circular hole or an elongated circular hole which has a second diameter, as the second width different from the first diameter, in the circumferential direction of the sleeve.

Herein, the term "elongated circular hole" encompasses an elliptical hole, and a racetrack-shaped hole whose cross section includes two semi-circular portions and a rectangular portion between the two semi-circular portions.

In this structure, since the shapes of the holes are simple, deburring or the like (finishing) after machining is easy, and rigidity can be increased by preventing stress concentration. Accordingly, bending (deformation) of the sleeve can be prevented, whereby the slidability of the spool can be enhanced.

According to one or more embodiments, at least one of the first through portion and the second through portion is a triangular hole having a side extending in the circumferential direction of the sleeve and having rounded corners. Therefore, rigidity can be increased by preventing stress concentration. Accordingly, bending (deformation) of the sleeve can be prevented, whereby the slidability of the spool can be enhanced.

According to one or more embodiments, the second through portion is more remote (i.e., farther away) from the second port in the axial direction than the first through portion, and the second width is larger than the first width.

In this structure, the second through portion is more remote from the second port in the axial direction than the first through portion. Therefore, when the diameter reduced portion of the spool moves from a position corresponding to the second port toward the first port in a state in which the first port is closed by the spool, the first through portion is first opened, and the second through portion is then opened. The second width of the second through portion is larger than the first width of the first through portion. Therefore, the gradient of the flow rate of the fluid can be decreased in a period in which the second through portion is closed and the open area of the first through portion increases; namely, in the period when the first port starts to open. Accordingly, it is possible to facilitate fine adjustment of the flow rate of the fluid at the time when the first port starts to open. Further, in a state in which the first port is closed, the fluid may leak from the gap between the inner circumferential surface of the sleeve and the outer circumferential surface of the spool. Since the fluid is less likely to flow through the second through portion whose width (second width) is larger than the first width, the leakage amount of the fluid can be reduced.

When the open area of the second through portion increases after that, the amount of increase in the flow rate with respect to the movement amount of the spool (the gradient of the flow rate) can be increased as compared with that when the open area of the first through portion increases. Therefore, in the spool valve which changes the gradient of the flow rate from a first gradient to a second gradient greater than the first gradient, the length of the sleeve necessary to secure a predetermined target flow rate can be shortened.

When the first through portion is a circular hole or an elongated circular hole which has a first diameter in the circumferential direction of the sleeve, the speed of increase of the open area of the first through portion increases in a first half and decreases in a second half.

In view of this, according to one or more embodiments, a range in which the first through portion is present and a range in which the second through portion is present partially overlap each other in the axial direction. Therefore, the second through portion starts to open before the first through portion opens completely. Thus, it is possible to prevent the speed of increase of the open area of the first port from decreasing after having increased. Namely, it is possible to prevent the gradient of the flow rate of the fluid from decreasing when the second through portion starts to open.

In the case where the range in which the first through portion is present and the range in which the second through portion is present partially overlap each other in the axial direction, the first through portion and the second through portion may be connected to each other (i.e., may communicate with each other). If the first through portion and the second through portion are connected to each other, the shape of the first port becomes complex, and the strength of the sleeve may decrease.

In view of this, according to one or more embodiments, the first through portion and the second through portion are formed at respective positions determined such that the first through portion and the second through portion do not overlap each other in the circumferential direction of the sleeve. Therefore, even in the case where the range in which the first through portion is present and the range in which the second through portion is present partially overlap each other in the axial direction, it is possible to prevent the first through portion and the second through portion from communicating with each other.

According to one or more embodiments, in a state in which the diameter reduced portion of the spool has moved in the axial direction from a position corresponding to the second port toward the first port by a largest amount (to the maximum distance), an opened portion of the second through portion is not greater than half. Therefore, even in the case where the second through portion is a circular hole or an elongated circular hole which has a first diameter in the circumferential direction of the sleeve, the flow rate of the fluid can be controlled within a range in which the speed of increase of the open area of the second through portion increases. Accordingly, it is possible to prevent the gradient of the flow rate of the fluid from decreasing after the second through portion has started to open.

According to one or more embodiments, the first port includes a plurality of the first through portions formed at different positions in the axial direction.

In the above-described structure of one or more embodiments, the first port includes a plurality of the first through portions. Therefore, the relation between the movement amount of the spool and the flow rate increase amount at the time when the first port starts to open can be easily set by adjusting the number of the first through portions. The positions of the first through portions in the axial direction differ from one another. Therefore, it is possible to decrease the number of the first through portions which are located near the diameter reduced portion of the spool in a state in which the first port is closed, whereby the amount of the fluid leaked from the gap between the inner circumferential surface of the sleeve and the outer circumferential surface of the spool can be reduced.

According to one or more embodiments, the first port includes a third through portion which is formed at a position between the first through portion and the second through portion in the axial direction and which is a through hole having a third width in the circumferential direction of the sleeve, the third width being larger than the first width and smaller than the second width.

In the above-described structure of one or more embodiments, the first port includes a third through portion which is formed at a position between the first through portion and the second through portion in the axial direction. Therefore, when the diameter reduced portion of the spool moves from a position corresponding to the second port toward the first port in a state in which the first port is closed by the spool, the first through portion is first opened, the third through portion is then opened, and the second through portion is opened last. The third through portion is a through hole having a third width in the circumferential direction of the sleeve, the third width being larger than the first width and smaller than the second width. Therefore, the gradient of the flow rate of the fluid in an intermediate period between the period in which the open area of the first through portion increases and the period in which the open area of the second through portion increases can be set more easily to an intermediate gradient between the gradients in these periods.

According to one or more embodiments, the second through portion is formed at the same position as the first through portion in the axial direction, and the second width is larger than the first width.

In the above-described structure of one or more embodiments, the second through portion is formed at the same position as the first through portion in the axial direction. Therefore, when the diameter reduced portion of the spool moves from a position corresponding to the second port toward the first port in a state in which the first port is closed by the spool, the first through portion and the second through portion start to open simultaneously. Therefore, the gradient of the flow rate of the fluid can be increased in a period in which both the open areas of the first through portion and the second through portion increase; namely, in the period when the first port starts to open.

In the case where the width of the second through portion in the axial direction is larger than the width of the first through portion in the axial direction, when the diameter reduced portion of the spool moves further from the position corresponding to the second port toward the first port, the first through portion is fully opened, and only the open area of the second through portion increases. Therefore, the gradient of the flow rate of the fluid can be set more easily to be smaller than that in the period in which the open areas of the first and second through portions increase. Accordingly, in the spool valve which changes the gradient of the flow rate of the fluid from a third gradient to a fourth gradient smaller than the third gradient, the length of the sleeve necessary to secure a predetermined target flow rate can be shortened.

According to one or more embodiments, a plurality of first ports is formed at different positions in the circumferential direction of the sleeve, and the spool valve includes a valve body in which the sleeve is disposed and which has an annular first groove through which the first ports communicate with one another and a first body through hole through which the first groove communicates with a space outside the valve body.

In the above-described structure of one or more embodiments, a plurality of first ports is formed at different positions in the circumferential direction of the sleeve. Therefore, the fluid can flow between the space inside the sleeve and the space outside the sleeve through the plurality of first ports. The spool valve has a valve body in which the sleeve is disposed. The valve body has an annular first groove through which the plurality of first ports communicates with one another, and a first body through hole through which the first groove communicates with the space outside the valve body. Therefore, the fluid can flow between the plurality of first ports and the space outside the valve body through the annular first groove and the first body through hole. Accordingly, it is possible to facilitate the flow of the fluid between the space inside the sleeve and the space outside the valve body while increasing the maximum flow rate of the fluid flowing through the spool valve.

According to one or more embodiments, a plurality of the second ports is formed at different positions in the circumferential direction of the sleeve, and the valve body has an annular second groove through which the second ports communicate with one another and a second body through hole through which the second groove communicates with the space outside the valve body.

In the above-described structure of one or more embodiments, a plurality of second ports is formed at different positions in the circumferential direction of the sleeve. Therefore, the fluid can flow between the space inside the sleeve and the space outside the sleeve through the plurality of second ports. The valve body has an annular second groove through which the plurality of first ports communicates with one another, and a second body through hole through which the second groove communicates with the space outside the valve body. Therefore, the fluid can flow between the plurality of second ports and the space outside the valve body through the annular second groove and the second body through hole. Accordingly, it is possible to facilitate the flow of the fluid between the space inside the sleeve and the space outside the valve body while increasing the maximum flow rate of the fluid flowing through the spool valve.

According to one or more embodiments, a first valve section and a second valve section each including the first port and the second port are juxtaposed in the axial direction. In the first valve section, the second through portion is formed at a position more remote from the second port than the first through portion in the axial direction, and the second width is larger than the first width. In the second valve section, the second through portion is formed at the same position as the first through portion in the axial direction, and the second width is larger than the first width. The diameter reduced portion is individually formed on the spool for each of the first valve section and the second valve section.

In the above-described structure of one or more embodiments, one valve section is formed through combined use of the first port and the second port. Therefore, the flow rate of one type of fluid can be controlled by one valve section. The spool valve includes the first and second valve sections which are valve sections juxtaposed in the axial direction. The spool has two diameter reduced portions individually provided for the first valve section and the second valve section. Therefore, the spool valve can control the flow rates of a plurality type of fluids.

The first valve section can change the gradient of flow rate from the first gradient to the second gradient larger than the first gradient. Meanwhile, the second valve section can change the gradient of flow rate from the third gradient to the fourth gradient smaller than the third gradient. Therefore, in the case where communication is established between one port of the first valve section and one port of the second valve section so as to use the spool valve as a mixing valve, the flow rate of the fluid mixture can be made approximately constant. Also, the spool valve can be used as a distribution valve by reversing the flow direction of the fluid in the above-mentioned mixing valve of one or more embodiments.

BRIEF DESCRIPTION OF THE DRAWINGS

The features and advantages of one or more embodiments of the present invention will be apparent from the following description made with reference to the accompanying drawings.

DETAILED DESCRIPTION

Embodiments of the invention will now be described with reference to the drawings. One or more embodiments provide a spool valve apparatus including a spool valve.

Figure 1:
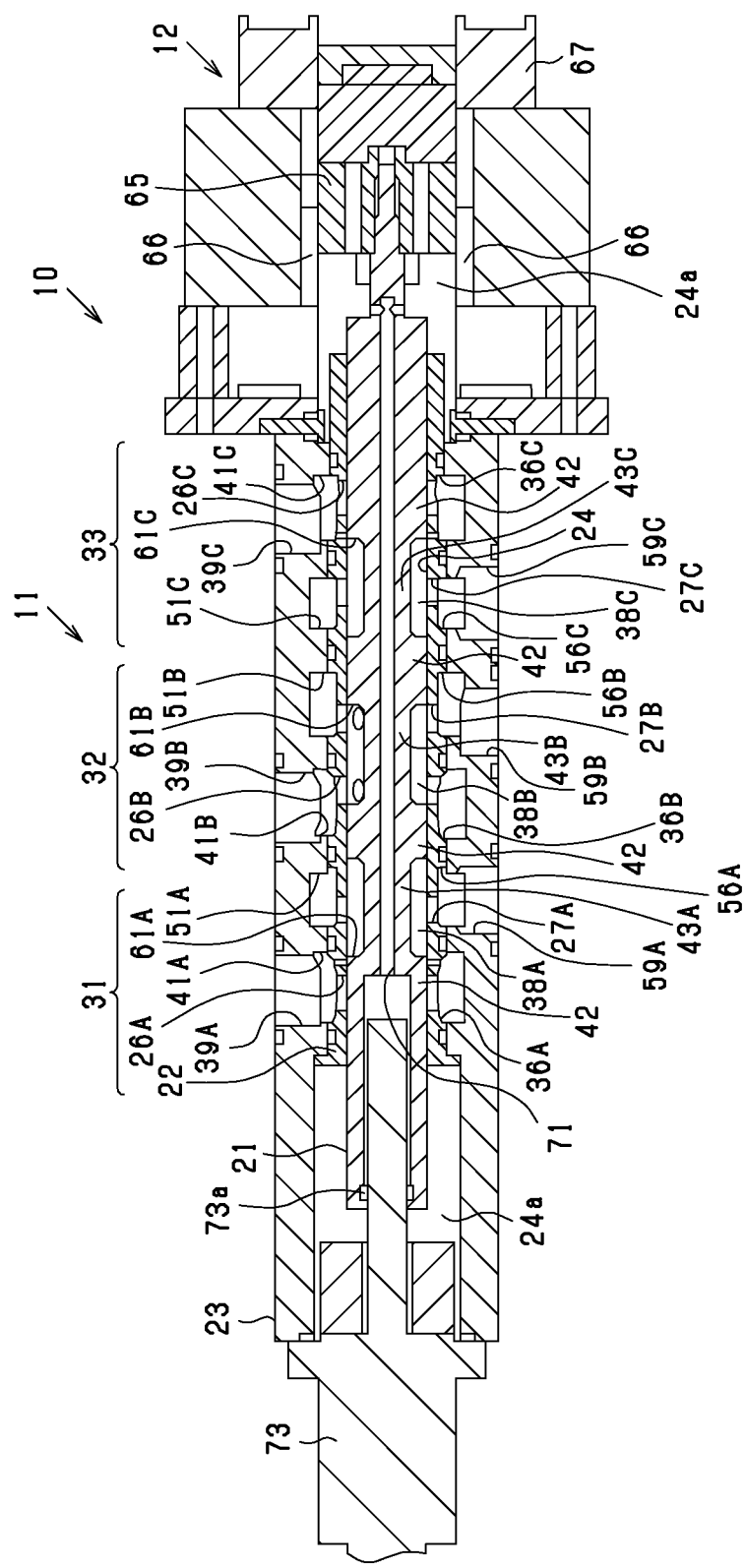
FIG. 1 is a sectional view of a spool valve apparatus according to one or more embodiments.

As shown in FIG. 1, a spool valve apparatus 10 includes a spool valve 11 serving as a fluid control valve, and a drive section 12 for operating the spool valve 11. The spool valve 11 is composed of a cylindrical columnar spool 21, a sleeve 22 which slidably supports the spool 21, and a valve body 23 which houses the spool 21 and the sleeve 22. The sleeve 22 has a cylindrical tubular shape. The valve body 23 is a case having an approximately rectangular parallelepiped shape. In the spool valve 11, a valve chamber 24 is formed by an internal space of the sleeve 22 and an internal space of the valve body 23, and the spool 21 is accommodated in the valve chamber 24. The spool 21 is smaller in length in its axial direction than the valve chamber 24 and is slidable in the axial direction of the spool 21 within the valve chamber 24.

The sleeve 22 has ports 26A, 26B, 26C, 27A, 27B, and 27C formed therein and communicating with the valve chamber 24. Of these ports, the ports 26A, 26B, and 26C will be referred to as "first ports 26A, 26B, and 26C," and the ports 27A, 27B, and 27C will be referred to as "second ports 27A, 27B, and 27C." The first ports 26A are formed at different positions in the circumferential direction of the sleeve 22. The remaining ports 26B, 26C, 27A, 27B, and 27C are formed in the same manner. Each of the first and second ports 26A, 26B, 26C, 27A, 27B, and 27C partially forms a fluid passage through which fluid such as liquid or gas flows. Each of the first ports 26A, 26B, and 26C serves as a supply port through which the fluid is supplied to the valve chamber 24. Each of the second ports 27A, 27B, and 27C serves as a discharge port through which the fluid is discharged from the valve chamber 24. These ports 26A, 26B, 26C, 27A, 27B, and 27C are arranged in the axial direction of the spool 21.

Supply passages including the first ports 26A, 26B, and 26C, respectively, will be described briefly. The first port 26A communicates with a first body through hole 39A through a first sleeve circumferential groove 36A and a first body circumferential groove 41A, whereby one supply passage is formed. The remaining supply passages are similarly formed by the first ports 26B and 26C, first sleeve circumferential grooves 36B and 36C, first body circumferential grooves 41B and 41C, and first body through holes 39B and 39C.

The first sleeve circumferential grooves 36A, 36B, and 36C are (annular) grooves formed on the outer circumferential surface of the sleeve 22 and extending in its circumferential direction. The plurality of first ports 26A communicates with one another through the first sleeve circumferential groove 36A. The first body circumferential grooves 41A, 41B, 41C (first grooves) are (annular) grooves formed on the inner circumferential surface of the valve body 23 and extending in its circumferential direction. The first body circumferential groove 41A is located radially outward of the first sleeve circumferential groove 36A and communicates with the first sleeve circumferential groove 36A. Namely, the plurality of first ports 26A communicates with one another through the first body circumferential groove 41A. The first body circumferential groove 41A establishes communication between the first sleeve circumferential groove 36A and the first body through hole 39A in the radial direction. The above description regarding the first sleeve circumferential groove 36A, the first body circumferential groove 41A, and the first body through hole 39A similarly applies to the first sleeve circumferential grooves 36B and 36C, the first body circumferential grooves 41B and 41C, and the first body through holes 39B and 39C.

Discharge passages including the second ports 27A, 27B, 27C, respectively, are similar to the supply passages including the first ports 26A, 26B, and 26C, respectively.

Namely, the second port 27A communicates with a second body through hole 59A through a second sleeve circumferential groove 56A and a second body circumferential groove 51A (second groove), whereby one discharge passage is formed. The remaining discharge passages are similarly formed by the second ports 27B and 27C, second sleeve circumferential grooves 56B and 56C, second body circumferential grooves 51B and 51C, and second body through holes 59B and 59C.

A communication passage 38A which can establish communication between the first ports 26A and the second ports 27A is formed in the valve chamber 24. The spool 21 is movable to a position at which the communication passage 38A establishes communication between the ports 26A and 27A and to a position at which the communication passage 38A does not establish communication between the ports 26A and 27A. The outer circumferential surface of the spool 21 overlaps the inner circumferential surface of the sleeve 22 and is in contact with or close proximity to the inner circumferential surface of the sleeve 22. When the communication passage 38A does not establish communication between the ports 26A and 27A, at least one of the ports 26A and 27A is closed by the outer circumferential surface of the spool 21. Meanwhile, when the communication passage 38A establishes communication between the ports 26A and 27A, the fluid flows from the first port 26A to the second port 27A through the communication passage 38A (the valve chamber 24). The above description regarding the first port 26A, the second port 27A, and the communication passages 38A similarly applies to the first ports 26B and 26C, the second ports 27B and 27C, and communication passages 38B and 38C.

The communication passage 38A is formed by a spool circumferential groove 61A provided on the outer circumferential surface of the spool 21. The spool circumferential groove 61A extends in the circumferential direction of the spool 21 and has a width in the axial direction larger than the distance of separation between the first port 26A and the second port 27A. When the spool circumferential groove 61A overlaps the first port 26A and the second port 27A in the axial direction of the spool 21, both the ports 26A and 27A communicate with the spool circumferential groove 61A, and communication is established between the ports 26A and 27A through the spool circumferential groove 61A.

Namely, when the communication passage 38A overlaps the first port 26A and the second port 27A, communication is established between the ports 26A and 27A through the communication passage 38A. Meanwhile, when the communication passage 38A does not communicate with at least one of the ports 26A and 27A, the communication between the ports 26A and 27A is cut off by the spool 21. The above description regarding the first port 26A, the second port 27A, the communication passage 38A, and the spool circumferential groove 61A similarly applies to the first ports 26B and 26C, the second ports 27B and 27C, the communication passages 38B and 38C, and spool circumferential grooves 61B and 61C.

Since the sliding direction of the spool 21 intersects with the direction in which the ports 26A and 27A are opened to the valve chamber 24, the width of overlapping between the communication passage 38A and the port 26A or 27B, as measured in the sliding direction, increases or decreases as the spool slides. Namely, the open area of the port 26A (27A) increases or decreases. When the fluid flows through the port 26A (27A), its flow rate increases with the open area of the port 26A (27A). When the open area is equal to or greater than a predetermined value, the flow rate becomes the maximum. In such a case, the port 26A (27A) is in a fully opened state. The above description regarding the first port 26A, the second port 27A, the communication passage 38A similarly applies to the first ports 26B and 26C, the second ports 27B and 27C, and the communication passages 38B and 38C.

A portion of the spool 21 where the spool circumferential groove 61A is formed will be referred to as a diameter reduced portion 43A because that portion is smaller in diameter than the remaining portion. Since the bottom of the spool circumferential groove 61A has curved (radiused) corners, stress concentration can be prevented. The above description regarding the spool circumferential groove 61A and the diameter reduced portion 43A similarly applies to the spool circumferential grooves 61B and 61C and diameter reduced portions 43B and 43C. In the spool 21, portions located adjacent to the diameter reduced portions 43A, 43B, and 43C, respectively, in the axial direction serve as closing portions 42. In one or more embodiments, a first one of the closing portions 42, the diameter reduced portion 43A, a second one of the closing portions 42, the diameter reduced portion 43B, a third one of the closing portion 42, the diameter reduced portion 43C, and a fourth one of the closing portion 42 are arranged in this order in the axial direction of the spool 21.

By virtue of the above-described configuration of one or more embodiments, the spool valve 11 has first through third valve sections 31 to 33 each of which allows the flow of the fluid therethrough and cuts off the flow. The first through third valve sections 31 to 33 are arranged in the axial direction of the spool 21. The first valve section 31 has the paired ports 26A and 27A, for which the communication passage 38A establishes communication therebetween. The above description regarding the first valve section 31, the communication passage 38A, the first port 26A, and the second port 27A similarly applies to the second valve section 32, the third valve section 33, the communication passages 38B and 38C, the first port 26B and 26C, and the second ports 27B and 27C. The spool 21 has the diameter reduced portions 43A, 43B, and 43C provided for the valve sections 31 to 33, respectively. Port opening operations at the valve sections 31 to 33 are individually performed by the diameter reduced portions 43A, 43B, and 43C as a result of sliding movement of the spool 21. The second valve section 32 is configured such that both the paired ports 26B and 27B can be closed. The first valve section 31 is configured such that only the first port 26A can be closed. Similarly, the third valve section 33 is configured such that only the first port 26C can be closed.

In one or more embodiments, the above-described spool valve 11 is used in a fluid circulating system which circulates a fluid used in a processing apparatus performing a predetermined processing operation so as to re-supply the fluid to the processing apparatus. The circulation passage of this system includes three passages; i.e., a heating line for heating the used fluid by a heating apparatus, a cooling line for cooling the used fluid by a cooling apparatus, and a bypass line for circulating the used fluid without heating or cooling. The upstream side of the processing apparatus is connected to the downstream ends of the above-described three passages through the spool valve 11. In this case, the spool valve 11 serves as a mixing valve for mixing the plurality of fluids flowing into the valve.

The pipe of the cooling line for supplying the cooling (COLD-side) fluid to the spool valve 11 is connected to the first body through hole 39A. The pipe of the bypass line for supplying the circulating (BYP-side) fluid to the spool valve 11 is connected to the first body through hole 39B. The pipe of the heating line for supplying the heating (HOT-side) fluid to the spool valve 11 is connected to the first body through hole 39C. The second body through holes 59A, 59B, and 59C are connected to a mixing pipe for mixing the fluids discharged from the spool valve 11. The mixing pipe is connected to the upstream side of the processing apparatus. When the fluids flow from the spool valve 11 into the processing apparatus, the flow rates of the fluids from the heating line, the cooling line, and the bypass line are adjusted simultaneously through sliding movement of the spool 21.

The drive section 12 of the spool valve apparatus 10 is a linear actuator. The drive section 12 includes a movable member 65 formed of a ferromagnetic material such as steel, a pair of permanent magnets 66 disposed such that the movable member 65 is located therebetween, and a coil 67 for generating a magnetic field in the same direction as the direction of the magnetic field of the permanent magnets 66. The movable member (movable element), which is movable in a direction orthogonal to the direction of the magnetic field of the permanent magnets 66, is fixed to one end of the spool 21 such that the moving direction of the movable member 65 coincides with the sliding direction of the spool 21. In the drive section 12, the position of the movable member 65; i.e., the axial position (stroke position) of the spool 21, is determined by the flow direction of current flowing through the coil 67 and the magnitude of voltage (current) applied to the coil 67.

When the movable member 65 is located at its neutral position in the drive section 12, the spool 21 is located at a position at which the spool 21 closes the first valve section 31 and the third valve section 33 and opens the second valve section 32. In this case, the spool 21 is also located at its neutral position. When the spool 21 is located at the neutral position, the first port 26A is closed in the first valve section 31, and the first port 26C is closed in the third valve section 33.

The movable member 65 must be located at the neutral position when the coil 67 is not energized. However, in a state in which the coil 67 is not energized, the movable member 65 may move from the neutral position due to the influence of the fluid flowing through the spool valve 11. The movable member 65 is held at the neutral position by the magnetic force generated as a result of energization of the coil 67. Specially, a position sensor 73 for detecting the stroke position of the spool 21 is provided in the spool valve apparatus 10. The position sensor 73 includes a detection magnet 73a. Feedback control is performed on the basis of the stroke position detected by the position sensor 73 such that the movable member 65 is located at the neutral position.

Notably, the position sensor 73 is provided at a position separated from the fluid within the valve chamber 24 and is not influenced by the fluid. The position sensor 73 is provided in such a manner that the position sensor 73 is free of contact with operating or moving members such as the spool 21. The position sensor 73 may be a capacitance type position sensor, a magnetostrictive type position sensor, or an eddy current type position sensor. The drive section 12 may include an urging means, such as a spring, which holds the movable member 65 at the neutral position when the coil 67 is not energized.

The spool 21 has a spool through hole 71 penetrating the spool 21 in the axial direction. In the valve chamber 24, spaces on opposite sides of the spool 21, which will be referred to as "expansion/contraction spaces 24a," are expanded and contracted when the spool 21 slides. The two expansion/contraction spaces 24a communicate with each other through the spool through hole 71. The expansion/contraction spaces 24a and the spool through hole 71 are filled with, for example, the fluid flowing through the valve sections 31 to 33. When the spool 21 slides, the fluid moves from one of the expansion/contraction spaces 24a to the other expansion/contraction space 24a through the spool through hole 71. Since this configuration reduces the reaction which is applied from the fluid within the expansion/contraction spaces 24a to the spool 21 when the spool 21 slides, the drive force which the drive section 12 must produce so as to slide the spool 21 can be reduced.

Figure 2:
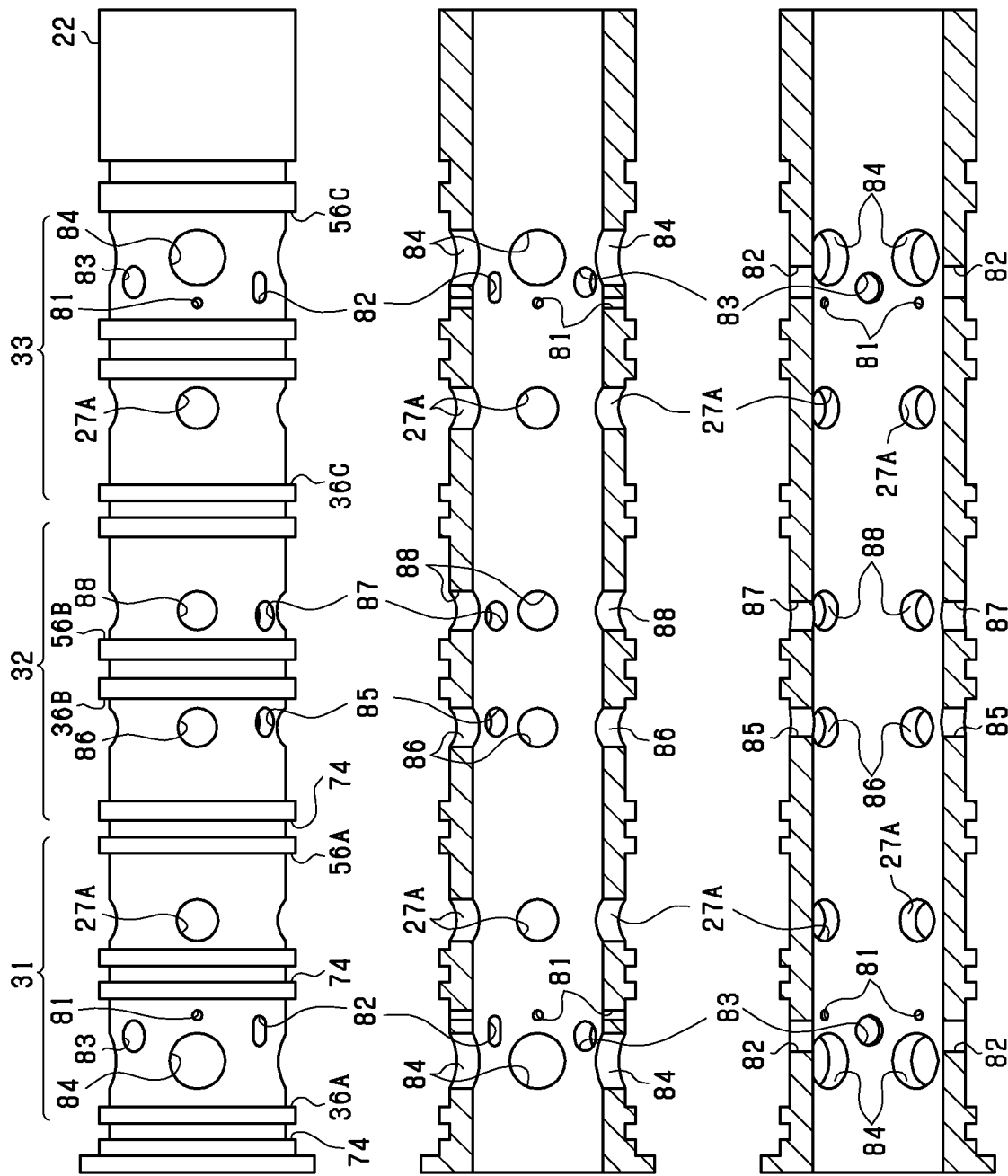
FIG. 2A-FIG. 2C include a set of views showing the shape of a sleeve according to one or more embodiments.

Next, the shape of the sleeve 22 will be described in detail with reference to FIG. 2A-FIG. 2C. FIG. 2A shows an external shape of the sleeve 22, FIG. 2B is a sectional view showing a section of the sleeve 22 passing through the centers of circular holes 81 and 84, and FIG. 2C is a sectional view showing a section of the sleeve 22 passing through the centers of elongated circular holes 82. In an outer circumferential portion of the sleeve 22, the above-described first sleeve circumferential groove 36A, second sleeve circumferential groove 56A, first sleeve circumferential groove 36B, second sleeve circumferential groove 56B, first sleeve circumferential groove 36C, and second sleeve circumferential groove 56C are formed in this order from the end of the sleeve 22 on the side toward the position sensor 73. The sleeve 22 has grooves 74 which are formed at positions adjacent to the sleeve circumferential grooves and into each of which a seal member such as an O-ring is fitted.

In the first valve section 31, the four (a plurality of) second ports 27A having the same shape and dimensions are formed at 90° intervals (equal intervals) in the circumferential direction of the sleeve 22. The positions of the four second ports 27A in the axial direction of the sleeve 22 coincide with one another. Each of the second ports 27A is a circular hole (through hole) having a predetermined diameter r0 in the circumferential direction and the axial direction of the sleeve 22.

The first ports 26A are formed at a position a predetermined distance separated from the second ports 27A in the axial direction of the sleeve 22. Each first port 26A includes a circular hole 81, an elongated circular hole 82, a circular hole 83, and a circular hole 84 which are through holes. In the circumferential direction of the sleeve 22, the center position of the circular hole 81 and the center position of the circular hole 84 coincide with each other. The circular hole 81, the elongated circular hole 82, and the circular hole 83 are formed at respective positions determined such that they do not overlap one another in the circumferential direction of the sleeve 22. The elongated circular hole 82, the circular hole 83, and the circular hole 84 are formed at respective positions determined such that they do not overlap one another in the circumferential direction of the sleeve 22.

The circular hole 81, the elongated circular hole 82, the circular hole 83, and the circular hole 84 are formed at different positions in the axial direction of the sleeve 22. The positions of the holes 81 to 84 in the axial direction of the sleeve 22 are defined by respective distances between the second ports 27A and ends of the holes 81 to 84 on the side toward the second ports 27A. The distance between the second ports 27A and the circular hole 81 is the shortest, the distance between the second ports 27A and the elongated circular hole 82 is the second shortest, the distance between the second ports 27A and the circular hole 83 is the third shortest, and the distance between the second ports 27A and the circular hole 84 is the fourth shortest; i.e., the longest. A range in which the circular hole 81 is present and a range in which the elongated circular hole 82 is present partially overlap each other in the axial direction of the sleeve 22. A range in which the elongated circular hole 82 is present and a range in which the circular hole 83 is present partially overlap each other in the axial direction of the sleeve 22. A range in which the circular hole 83 is present and a range in which the circular hole 84 is present partially overlap each other in the axial direction of the sleeve 22. The holes 81 to 84 are not connected with one another.

The circular holes 81, 83, and 84 have diameters r1, r3, and r4, respectively, in the circumferential direction and the axial direction of the sleeve 22. The elongated circular hole 82 has a diameter r2 in the circumferential direction of the sleeve 22 and a diameter larger than the diameter r2 in the axial direction of the sleeve 22. The diameter r1 is the smallest, the diameter r2 is the second smallest, the diameter r3 is the third smallest, and the diameter r4 is the fourth smallest; i.e., the largest. The four (a plurality of) first ports 26A are formed at 90° intervals (equal intervals) in the circumferential direction of the sleeve 22. Although the circular holes 81 and 84 are contained in each of the four (all) first ports 26A, the elongated circular hole 82 and the circular hole 83 are contained in each of only two (half) first ports 26A.

Notably, when the circular hole 81 is considered as the first through portion, the holes 82 to 84 can be considered as the second through portion. When the circular hole 81 is considered as the first through portion and the circular hole is considered as the second through portion, the holes 82 and 83 can be considered as the third through portion. When the circular hole 81 is considered as the first through portion and the circular hole 83 is considered as the second through portion, the elongated circular hole 82 can be considered as the third through portion. When the elongated circular hole 82 is considered as the first through portion, the circular holes 83 and 84 can be considered as the second through portion. When the elongated circular hole 82 is considered as the first through portion and the circular hole 84 is considered as the second through portion, the circular hole 83 can be considered as the third through portion. When the circular hole 83 is considered as the first through portion, the circular hole 84 can be considered as the second through portion. The third valve section 33 whose shape is a mirror image of the shape of the first valve section 31 is provided at a position symmetric with the position of the first valve section 31 with respect to the second valve section 32.

The second valve section 32 has the first ports 26B each including circular holes 85 and 86 which are through holes, and the second ports 27B each including circular holes 87 and 88 which are through holes. The second ports 27B are separated from the first ports 26B by a predetermined distance in the axial direction of the sleeve 22.

The circular hole 85 and the circular hole 86 are formed at respective positions determined such that they do not overlap each other in the circumferential direction of the sleeve 22. The circular hole 85 and the circular hole 86 are located at the same position in the axial direction of the sleeve 22. The positions of the circular holes 85 and 86 in the axial direction of the sleeve 22 are defined by respective distances between the circular holes 87 (the second ports 27B) and ends of the circular holes 85 and 86 on the side toward the circular holes 87. A range in which the circular hole 85 is present and a range in which the circular hole 86 is present partially overlap each other in the axial direction of the sleeve 22. The circular hole 85 and the circular hole 86 are not connected with each other.

The circular holes 85 and 86 have diameters r5 and r6, respectively, in the circumferential direction and the axial direction of the sleeve 22. The diameter r6 is smaller than the diameter r4 of the above-mentioned circular hole 84 and is larger than the diameter r1 to r3 of the holes 81 to 83 and the diameter r5 of the circular hole 85. The four first ports 26B are formed at 90° intervals (equal intervals) in the circumferential direction of the sleeve 22. Although the circular hole 86 is contained in each of the four (all) first ports 26B, the circular hole 85 is contained in each of only two (half) first ports 26B. Notably, the circular hole 85 corresponds to the first through portion, and the circular hole 86 corresponds to the second through portion.

The circular hole 87 and the circular hole 88 are formed at respective positions determined such that they do not overlap each other in the circumferential direction of the sleeve 22. The circular hole 87 and the circular hole 88 are located at the same position in the axial direction of the sleeve 22. The positions of the circular holes 87 and 88 in the axial direction of the sleeve 22 are defined by respective distances between the circular holes 85 (the first ports 26B) and ends of the circular holes 87 and 88 on the side toward the circular holes 85. A range in which the circular hole 87 is present and a range in which the circular hole 88 is present partially overlap each other in the axial direction of the sleeve 22. The circular hole 87 and the circular hole 88 are not connected with each other.

The circular holes 87 and 88 have diameters r7 and r8, respectively, in the circumferential direction and the axial direction of the sleeve 22. The diameter r8 is smaller than the diameter r4 of the above-mentioned circular hole 84 and is larger than the diameter r1 to r3 of the holes 81 to 83 and the diameter r7 of the circular hole 87. The four (a plurality of) second ports 27B are formed at 90° intervals (equal intervals) in the circumferential direction of the sleeve 22. Although the circular hole 88 is contained in each of the four (all) second ports 27B, the circular hole 87 is contained in each of only two (half) second ports 27B. Notably, the circular hole 87 corresponds to the first through portion, and the circular hole 88 corresponds to the second through portion.

Figure 3:
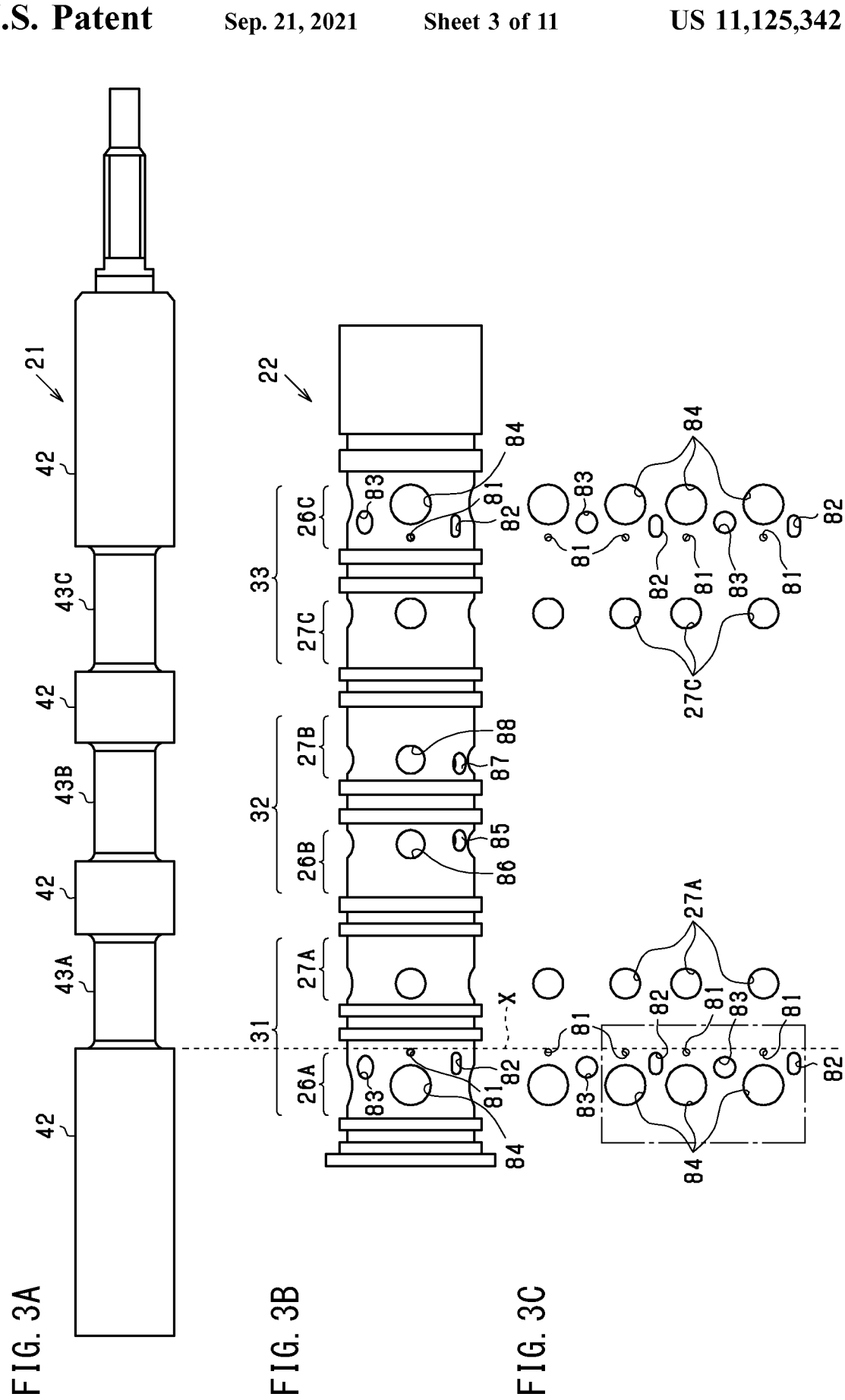
FIG. 3A-FIG. 3C include a set of views showing the positional relation between a spool and holes of the sleeve according to one or more embodiments.

FIG. 3A-FIG. 3C include a set of views showing the positional relation between the spool 21 and the holes 81 to 88 of the sleeve 22. FIG. 3C shows the holes 81 to 84 in the first valve section 31 and the third valve section 33, which are unfolded in the circumferential direction of the sleeve 22.

When the control command value is 0% (neutral position), the closing portions 42 of the spool 21 fully close the first ports 26A of the first valve section 31 and the first ports 26C of the third valve section 33, and the diameter reduced portion 43B of the spool 21 fully opens the first ports 26B and the second ports 27B of the second valve section 32. As the control command value increases, the diameter reduced portion 43C of the spool 21 opens the first ports 26C of the third valve section 33, and a corresponding one of the closing portions 42 (hereinafter referred to as the "corresponding closing portion 42") closes the first ports 26B of the second valve section 32. When the control command value is 100%, the diameter reduced portion 43C of the spool 21 fully opens the first ports 26C of the third valve section 33, and the corresponding closing portion 42 fully closes the first ports 26B of the second valve section 32. Also, as the control command value decreases from 0%, the diameter reduced portion 43A of the spool 21 opens the first ports 26A of the first valve section 31, and a corresponding one of the closing portions 42 closes the second ports 27B of the second valve section 32. When the control command value is −100%, the diameter reduced portion 43A of the spool 21 fully opens the first ports 26A of the first valve section 31, and the corresponding closing portion 42 fully closes the second ports 27B of the second valve section 32.

FIG. 3A-FIG. 3C show a state in which, as a result of leftward movement of the spool 21, the diameter reduced portion 43A starts to open the circular holes 81 in the first valve section 31. Notably, in the second valve section 32, a corresponding one of the closing portions 42 starts to close the fully opened circular holes 88. In the third valve section 33, a corresponding one of the closing portion 42 has closed the circular holes 81, which is a state in which the circular holes 81 are fully closed.

Figure 4:
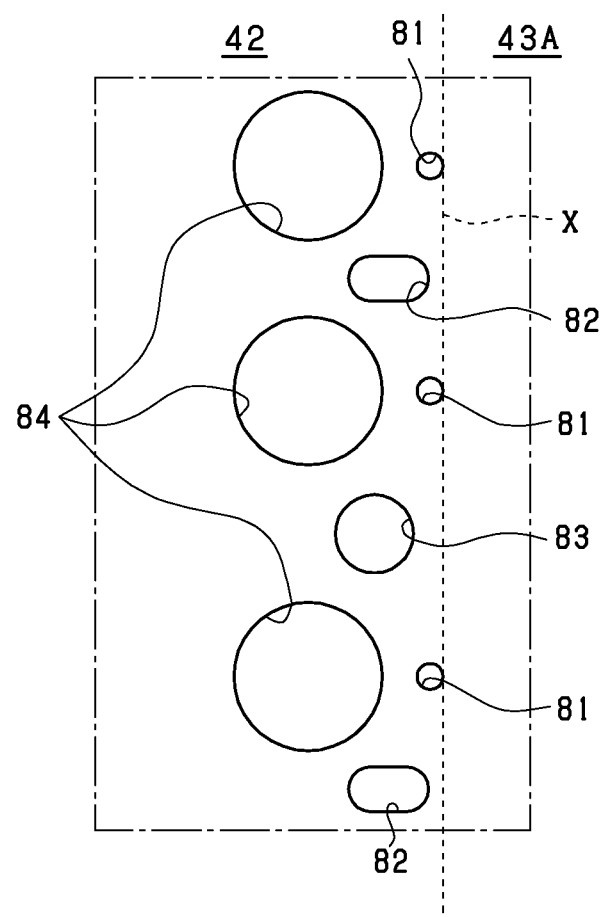
FIG. 4 is an enlarged unfolded view showing, on an enlarged scale, a portion of FIG. 3C surrounded by an alternate long and short dash line according to one or more embodiments.

A broken line X shows the boundary between the leftmost closing portion 42 and the diameter reduced portion 43A. FIG. 4 is an enlarged unfolded view showing, on an enlarged scale, a portion of FIG. 3C surrounded by an alternate long and short dash line. As shown in FIG. 4, only the circular holes 81 are tangent to the broken line X, and the holes 82 to 84 are located away from the broken line X. Therefore, in a state in which the first ports 26A of the first valve section 31 are closed, it is possible to prevent the fluid from leaking to the diameter reduced portion 43A from the gap between the inner circumferential surface of the sleeve 22 and the outer circumferential surface of the spool 21 through the holes 82 to 84. The diameter r1 of the circular holes 81 is smaller than the diameters r2 to r4 of the holes 82 to 84. Accordingly, in a state in which the first ports 26A of the first valve section 31 are closed, it is possible to reduce the amount of leakage of the fluid from the gap between the inner circumferential surface of the sleeve 22 and the outer circumferential surface of the spool 21. Similarly, in a state in which the first ports 26C of the third valve section 33 are closed, it is possible to reduce the amount of leakage of the fluid from the gap between the inner circumferential surface of the sleeve 22 and the outer circumferential surface of the spool 21.

Figure 5:
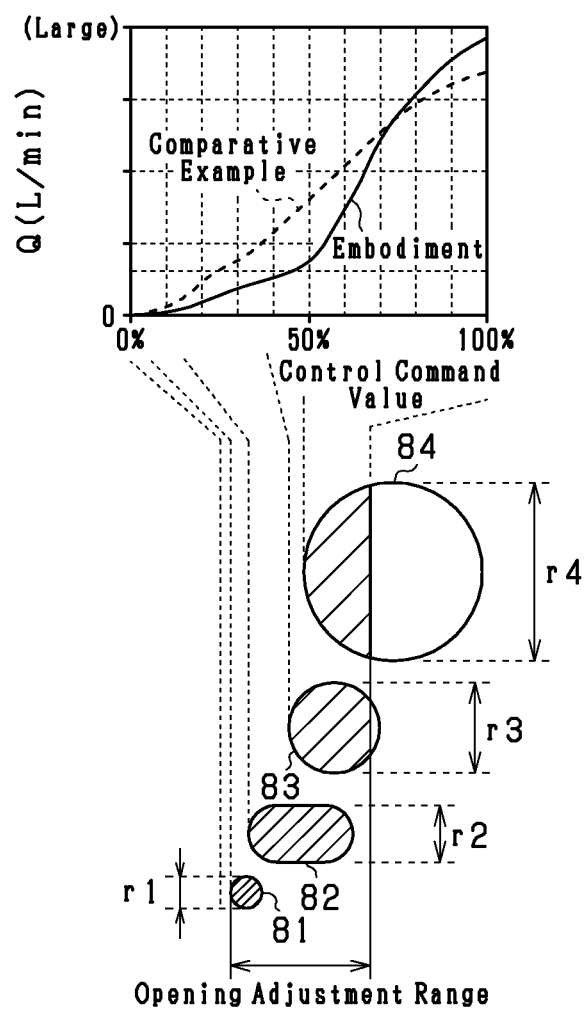
FIG. 5 includes a graph and a view which show the relation among control command value, flow rate, and open portions of holes according to one or more embodiments.

FIG. 5 includes a graph and a view which show the relation among the control command value, flow rate Q, and open portions of the holes 81 to 84 (the first port 26C). FIG.

5 shows the flow rate at which the heating fluid from the above-described heating line flows through the third valve section 33.

When the control command value is 0%, all the holes 81 to 84 are closed by a corresponding one of the closing portions 42 (hereinafter referred to as the "corresponding closing portion 42"), and the flow rate is 0 (L/min). Until the control command value increases from 0% to a few percent, all the holes 81 to 84 are closed by the corresponding closing portion 42, and the flow rate is 0 (L/min). Namely, the third valve section 33 has a dead band near the point where the control command value is 0%.

When the control command value increases further, the diameter reduced portion 43C of the spool 21 starts to open the circular holes 81. Since the diameter r1 of the circular holes 81 in the circumferential direction of the sleeve 22 is smaller than the diameters r2 to r4 of the holes 82 to 84, the flow rate of the fluid increases most slowly. Namely, the gradient of the flow rate with respect to the control command value (the movement amount of the spool 21) becomes the smallest.

When the circular holes 81 are opened half, the diameter reduced portion 43C starts to open the elongated circular holes 82. Since the circular holes 81 are circular holes having the diameter r1 in the circumferential direction of the sleeve 22, the speed of increase of the open area of each circular hole 81 increases in a first half and decreases in a second half. Since the diameter reduced portion 43C starts to open the elongated circular holes 82 when the circular holes 81 are opened half, the speed of increase of the open area of the first port 26C is prevented from decreasing after having increased. Since the diameter r2 of the elongated circular holes 82 is larger than the diameter r1 of the circular holes 81 and is smaller than the diameters r3 and r4 of the circular holes 83 and 84, the flow rate of the fluid increases slowly. Since rectangular portions of the elongated circular holes 82 are opened after semi-circular portions of the elongated circular holes 82 have been opened, the gradient of the flow rate with respect to the control command value becomes constant.

When the control command value increases further, the diameter reduced portion 43C starts to open the circular holes 83. Since the diameter r3 of the circular holes 83 in the circumferential direction of the sleeve 22 is larger than the diameters r1 and r2 of the holes 81 and 82 and is smaller than the diameter r4 of the circular holes 84, the flow rate of the fluid increases somewhat sharply.

When the control command value becomes 50%, the diameter reduced portion 43C starts to open the circular holes 84. Since the diameter r4 of the circular holes 84 in the circumferential direction of the sleeve 22 is larger than the diameters r1 to r3 of the holes 81 to 83, the flow rate of the fluid increases most sharply. Namely, the gradient of the flow rate with respect to the control command value becomes the largest.

When the control command value becomes 100%, the diameter reduced portion 43C of the spool 21 is moved from a position corresponding to the second ports 27C toward the first ports 26C by the largest amount in the axial direction of the sleeve 22. In this state, the opened portion of each circular hole 84 is not greater than half. Therefore, it is possible to end the operation of opening the circular holes 84 in a first half in which the speed of increase of the open area of each circular hole 84 increases, so that the operation of opening the circular holes 84 is not performed in a second half in which the speed of increase of the open area of each circular hole 84 decreases. Accordingly, it is possible to prevent a drop in the speed of increase of the open area of each first port 26C.

A relation similar to the above-described relation holds between the control command value and the flow rate at which the cooling fluid from the above-described cooling line flows through the first valve section 31. In this case, the control command value is negative, and the control command value decreases instead of increasing.

Meanwhile, as shown in FIG. 3A-FIG. 3C, when the control command value is 0%, the holes 85 to 88 are fully opened, and the flow rate of the circulating fluid from the circulating line is the maximum. Until the control command value increases from 0% to a positive few percent or decreases from 0% to a negative few percent, the holes 85 to 88 are fully opened, and the flow rate is the maximum. Namely, the second valve section 32 has a dead band near the point where the control command value is 0%.

When the control command value increases, a corresponding one of the closing portions 42 (hereinafter referred to as the "corresponding closing portion 42") starts to close the circular holes 86. The diameter r6 of the circular holes 86 in the circumferential direction of the sleeve 22 is smaller than the diameter r4 of the above-mentioned circular holes 84 and is larger than the diameters r1 to r3 of the holes 81 to 83 and the diameter r5 of the circular holes 85. Therefore, the flow rate of the fluid decreases slowly; specifically, at a decreasing speed similar to a flow rate increasing speed achieved when the holes 81 and 82 are opened.

When the control command value increases further, a corresponding one of the closing portions 42 (hereinafter referred to as the "corresponding closing portion 42") starts to close the circular holes 85. Namely, the circular holes 86 and the circular holes 85 are closed by the corresponding closing portion 42. Therefore, the flow rate of the fluid decreases sharply; specifically, at a speed similar to the speed at which the flow rate increases when the circular holes 83 and 84 are opened.

When the control command value becomes 100%, the diameter reduced portion 43B of the spool 21 is moved from a position corresponding to the first ports 26B toward the second ports 27B by the largest amount in the axial direction of the sleeve 22. In this state, the circular holes 85 and 86 are fully closed.

Figure 6:
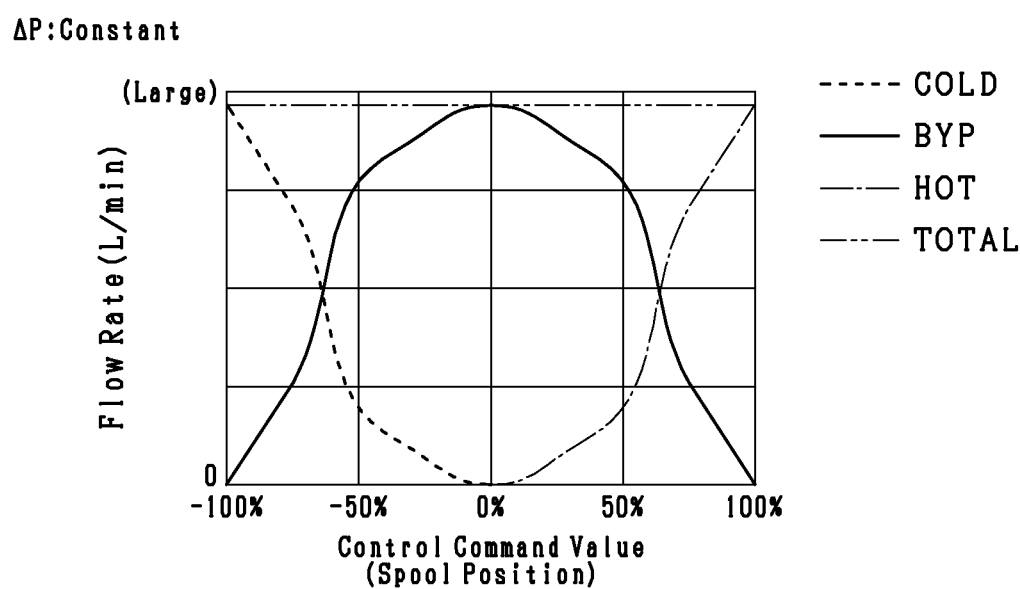
FIG. 6 is a graph showing the relation between the control command value and flow rates at valve sections according to one or more embodiments.

FIG. 6 is a graph showing the relation between the control command value and the flow rates in the valve sections 31 to 33. The flow rate of the cooling fluid (COLD) is adjusted by the first valve section 31, the flow rate of the circulating fluid (BYP) is adjusted by the second valve section 32, and the flow rate of the heating fluid (HOT) is adjusted by the third valve section 33.

As shown in FIG. 6, when the control command value is −100%, the flow rate of the cooling fluid (COLD) is the maximum, and both the flow rate of the circulating fluid (BYP) and the flow rate of the heating fluid (HOT) are zero. When the control command value includes from −100% to −50%, as a result of the increase of the control command value, the flow rate of the cooling fluid (COLD) decreases sharply, and the flow rate of the circulating fluid (BYP) increases sharply. The total flow rate (TOTAL) of the fluids discharged from the spool valve 11 is constant irrespective of the control command value.

When the control command value further increases from −50%, the flow rate of the cooling fluid (COLD) decreases somewhat slowly, and the flow rate of the circulating fluid (BYP) increases somewhat slowly. When the control command value further increases, the flow rate of the cooling fluid (COLD) decreases most slowly, and the flow rate of the circulating fluid (BYP) increases most slowly.

When the control command value becomes a negative few percent, the flow rate of the cooling fluid (COLD) becomes zero, and the flow rate of the circulating fluid (BYP) becomes the maximum. Until the control command value becomes a positive few percent, the flow rate of the cooling fluid (COLD) is maintained at zero, and the flow rate of the circulating fluid (BYP) is maintained at the maximum.

When the control command value increases beyond the positive few percent, the flow rate of the circulating fluid (BYP) decreases most slowly, and the flow rate of the heating fluid (HOT) increases most slowly. Until the control command value reaches 50%, as the control command value increases, the flow rate of the circulating fluid (BYP) decreases somewhat slowly, and the flow rate of the heating fluid (HOT) increases somewhat slowly.

When the control command value increases from 50% to 100%, as a result of the increase of the control command value, the flow rate of the circulating fluid (BYP) decreases sharply, and the flow rate of the heating fluid (HOT) increases sharply. Notably, the relations between the control command value and the flow rates in the valve sections 31 to 33 are not limited to those shown in FIG. 6 and may be set freely by adjusting the positions and diameters r1 to r8 of the holes 81 to 88.

FIG. 7A-FIG. 7E include a set of sectional views each showing the relation between the position of the spool 21 and the open/closed states of the valve sections 31 to 33.

Figure 7:
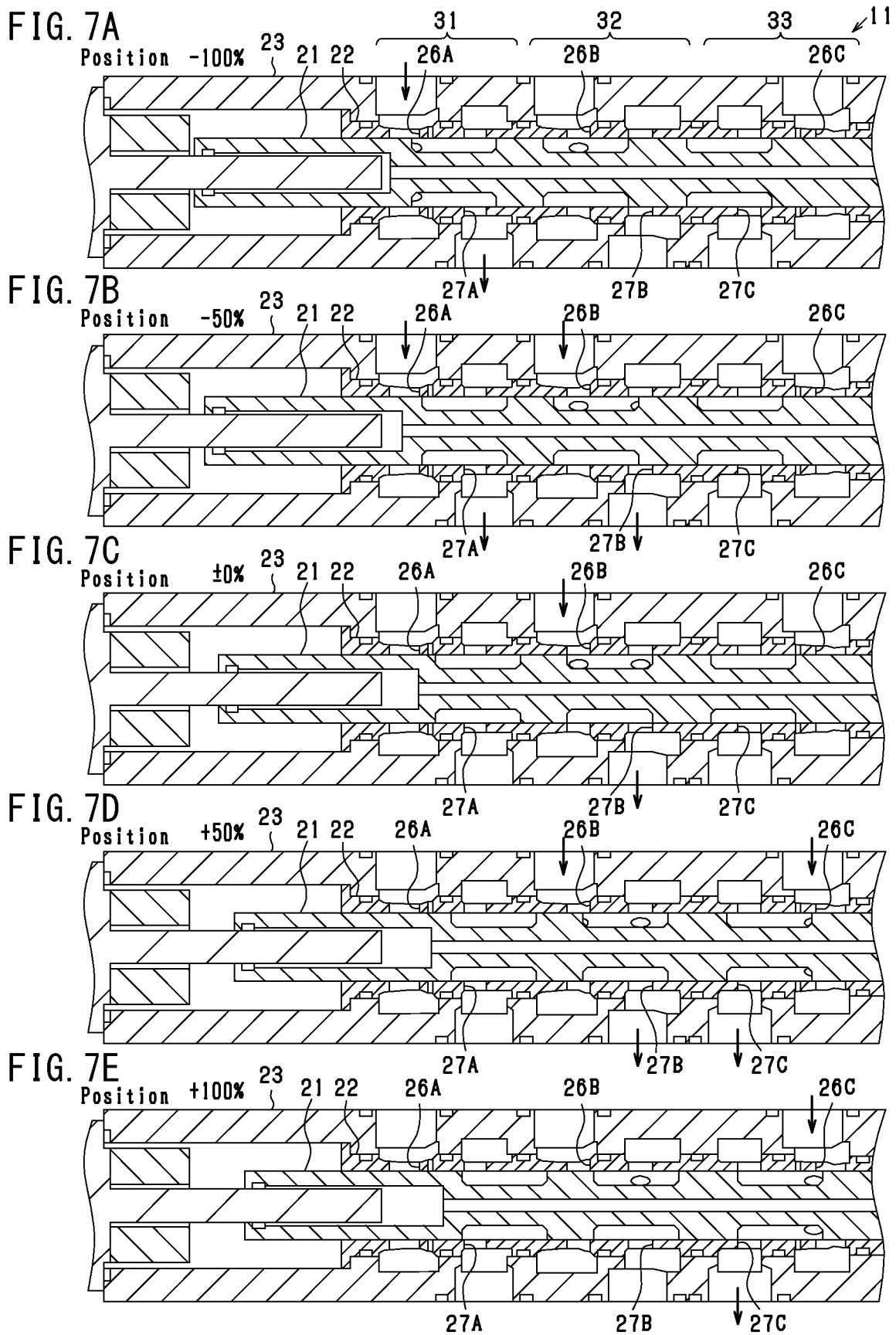
FIG. 7A-FIG. 7E include a set of sectional views showing the relation between the position of the spool and the open/close states of the valve sections according to one or more embodiments.

As shown in FIG. 7A, when the control command value is −100%, the spool 21 is located at a position to which the spool 21 has moved from the neutral position toward the first valve section 31 side (in the negative direction) by the largest amount. As shown in FIG. 6, the flow rate of the fluid flowing through the first valve section 31 (COLD) is controlled to the maximum flow rate, and the flow rate of the fluid flowing through the second valve section 32 (BYP) and the flow rate of the fluid flowing through the third valve section 33 (HOT) are controlled to zero. In the first valve section 31, both the first ports 26A and the second ports 27A are fully opened. In the second valve section 32, of the first ports 26B and the second ports 27B, the second ports 27B are closed. In the third valve section 33, of the first ports 26C and the second ports 27C, the first ports 26C are closed. In this case, only the cooling fluid (COLD) flows to the processing apparatus through the first valve section 31.

As shown in FIG. 7B, when the control command value is −50%, the spool 21 is located midway between the neutral position and the position to which the spool 21 has moved in the negative direction by the largest amount. As shown in FIG. 6, the flow rate of the fluid flowing through the first valve section 31 (COLD) is controlled to about 20% of the maximum flow rate, the flow rate of the fluid flowing through the second valve section 32 (BYP) is controlled to about 80% of the maximum flow rate, and the flow rate of the fluid flowing through the third valve section 33 (HOT) is controlled to zero. In the first valve section 31, the first ports 26A are opened such that the percentage of the open area of each first port 26A becomes about 20%. In the second valve section 32, of the first ports 26B and the second ports 27B, the second ports 27B are opened such that the percentage of the open area of each second port 27B becomes about 80%. In the third valve section 33, of the first ports 26C and the second ports 27C, the first ports 26C are closed. In this case, the cooling fluid (COLD) flowing through the first valve section 31 and the circulating fluid (BYP) flowing through the second valve section 32 are mixed and the resultant fluid flows to the processing apparatus.

As shown in FIG. 7C, when the control command value is 0%, the spool 21 is located at the neutral position. As shown in FIG. 6, the flow rate of the fluid flowing through the second valve section 32 (BYP) is controlled to the maximum flow rate, and the flow rate of the fluid flowing through the first valve section 31 (COLD) and the flow rate of the fluid flowing through the third valve section 33 (HOT) are controlled to zero. In the first valve section 31, of the first ports 26A and the second ports 27A, the first ports 26A are closed. In the second valve section 32, both the first ports 26B and the second ports 27B are fully opened. In the third valve section 33, of the first ports 26C and the second ports 27C, the first ports 26C are closed. In this case, only the circulating fluid (BYP) flows to the processing apparatus through the second valve section 32.

As shown in FIG. 7D, when the control command value is 50%, the spool 21 is located midway between the neutral position and a position to which the spool 21 moves toward the third valve section 33 side (in the positive direction) by the largest amount. As shown in FIG. 6, the flow rate of the fluid flowing through the first valve section 31 (COLD) is controlled to zero, the flow rate of the fluid flowing through the second valve section 32 (BYP) is controlled to about 80% of the maximum flow rate, and the flow rate of the fluid flowing through the third valve section 33 (HOT) is controlled to about 20% of the maximum flow rate. In the first valve section 31, of the first ports 26A and the second ports 27A, the first ports 26A are closed. In the second valve section 32, of the first ports 26B and the second ports 27B, the first ports 26B are opened such that the percentage of the open area of each first port 26B becomes about 80%. In the third valve section 33, of the first ports 26C and the second ports 27C, the first ports 26C are opened such that the percentage of the open area of each first port 26C becomes about 20%. In this case, the circulating fluid (BYP) flowing through the second valve section 32 and the heating fluid (HOT) flowing through the third valve section 33 are mixed and the resultant fluid flows to the processing apparatus.

As shown in FIG. 7E, when the control command value is 100%, the spool 21 is located at the position to which the spool 21 has moved from the neutral position toward the third valve section 33 side (in the positive direction) by the largest amount. As shown in FIG. 6, the flow rate of the fluid flowing through the third valve section 33 (HOT) is controlled to the maximum flow rate, and the flow rate of the fluid flowing through the second valve section 32 (BYP) and the flow rate of the fluid flowing through the first valve section 31 (COLD) are controlled to zero. In the first valve section 31, of the first ports 26A and the second ports 27A, the first ports 26A are closed. In the second valve section 32, of the first ports 26B and the second ports 27B, the first ports 26B are closed. In the third valve section 33, both the first ports 26C and the second ports 27C are fully opened. In this case, only the heating fluid (HOT) flows to the processing apparatus through the third valve section 33.

The above-described embodiments have the following advantages.

Each of the first ports 26A and 26C is composed of the circular hole 81 having the diameter r1 in the circumferential direction of the sleeve 22, and the elongated circular hole 82 having the diameter r2 different from the diameter r1 in the circumferential direction of the sleeve 22. Therefore, in accordance with the movement amount of the spool 21 in the axial direction of the sleeve 22, various states can be realized, for example, a state in which the elongated circular hole 82 is closed and the circular hole 81 is partially opened, a state in which the circular hole 81 is fully opened and the elongated circular hole 82 is partially opened, and a state in which the circular hole 81 is fully opened and the elongated circular hole 82 is fully opened. The relation between the amount of axial movement of the spool 21 and the amount of increase in the flow rate of the fluid (the gradient of the flow rate) differ among these states. Therefore, the relation between the amount of axial movement of the spool 21 and the amount of increase in the flow rate of the fluid can be flexibly set by adjusting the positions of the circular hole 81 and the elongated circular hole 82 in the axial direction and adjusting the diameters r1 and r2. Notably, an action and an effect similar to those described above can be obtained by other combinations of holes, for example, the combination of the circular hole 83 and the circular hole 84.

Since the circular hole 81 and the elongated circular hole are circular and elongated circular, respectively, these holes can be easily formed by means of hole machining such as drilling. In addition, since the shapes of the holes are simple, deburring or the like (finishing) after the machining is easy, and rigidity can be increased by preventing stress concentration. Therefore, bending (deformation) of the sleeve 22 can be prevented, whereby the slidability of the spool 21 can be enhanced. Also, since the relation between the movement amount of the spool 21 and the amount of increase in the flow rate of the fluid can be set by adjusting the positions of the circular hole 81 and the elongated circular hole 82 in the axial direction and adjusting their diameters r1 and r2, it is unnecessary to form a sloping portion on the spool 21 as in the case of the conventional spool valve described in the related art section. Accordingly, it is possible to prevent an increase in the degree of difficulty in manufacturing the spool valve 11.

In each of the first valve section 31 and the third valve section 33, the elongated circular holes 82 are located more remote from the second ports 27A or 27C in the axial direction than the circular holes 81. Therefore, when the diameter reduced portion 43A or 43C of the spool 21 moves from a position corresponding to the second ports 27A or 27C toward the first ports 26A or 26C in a state in which the first ports 26A or 26C are closed by the spool 21, the circular holes 81 are first opened, and the elongated circular holes 82 are then opened. The diameter r2 of the elongated circular holes 82 is larger than the diameter r1 of the circular holes 81. Therefore, the gradient of the flow rate of the fluid can be decreased in a period in which the elongated circular holes 82 are closed, and the open area of each circular hole 81 increases; namely, in the period when the first ports 26A or 26C start to open. Accordingly, it is possible to facilitate fine adjustment of the flow rate of the fluid at the time when the first ports 26A or 26C start to open. Further, in a state in which the first ports 26A or 26C are closed, the fluid may leak from the gap between the inner circumferential surface of the sleeve 22 and the outer circumferential surface of the spool 21. Since the fluid is less likely to flow through the elongated circular holes 82 whose diameter r2 is larger than the diameter r1, the leakage amount of the fluid can be reduced.

When the open areas of the circular holes 83 and 84 increase, the amount of increase in the flow rate with respect to the movement amount of the spool 21 (the gradient of the flow rate) can be increased as compared with that when the open area of each circular hole 81 increases. Therefore, in the spool valve 11 which changes the gradient of the flow rate from a first gradient to a second gradient greater than the first gradient, the length of the sleeve 22 necessary to secure a predetermined target flow rate can be shortened.

Since each circular hole 81 is a circular hole having the diameter r1 in the circumferential direction of the sleeve 22, the speed of increase of the open area of each circular hole 81 increases in a first half and decreases in a second half. In the axial direction, the range in which the circular hole 81 is present and the range in which the elongated circular hole 82 is present partially overlap each other. Therefore, the elongated circular hole 82 starts to open before the circular hole 81 opens completely, and it is possible to prevent the speed of increase of the open area of each first port 26A or 26C from decreasing after having increased. Namely, it is possible to prevent the gradient of the flow rate of the fluid from decreasing when the elongated circular hole 82 starts to open. Notably, an action and an effect similar to those described above can be obtained by other combinations of holes, for example, the combination of the circular hole 82 and the circular hole 84.

In the case where the holes 81 to 83 in each of the first ports 26A and 26C are connected to one another, the shape of the first ports 26A and 26C becomes complex, and the strength of the sleeve 22 may decrease. In one or more embodiments, the holes 81 to 83 are formed such that the holes 81 to 83 do not overlap one another in the circumferential direction of the sleeve 22. Therefore, even in the case where the range in which the circular hole 81 (the elongated circular hole 82) is present and the range in which the elongated circular hole 82 (the circular hole 83) is present partially overlap each other in the axial direction, it is possible to prevent the circular hole 81 (the elongated circular hole 82) and the elongated circular hole 82 (the circular hole 83) from communicating with each other.

In a state in which the corresponding diameter reduced portion of the spool 21 has been moved in the axial direction from a positon corresponding to the second ports 27A or 27C toward the first ports 26A or 26C by the largest amount, the opened portion of each circular hole 84 is not greater than half. Therefore, the flow rate of the fluid can be controlled within a range within which the speed of increase of the open area of each circular hole 84 increases. Accordingly, it is possible to prevent the gradient of the flow rate of the fluid from decreasing after the circular hole 84 has started to open.

Each of the first ports 26A and 26C has the holes 82 and 83 formed between the circular hole 81 and the circular hole 84 in the axial direction. Therefore, when the corresponding diameter reduced portion of the spool 21 moves from a position corresponding to the second ports 27A or 27C toward the first ports 26A or 26C in a state in which the first ports 26A or 26C are closed by the spool 21, the circular hole 81 is first opened, the holes 82 and 83 are then opened, and the circular hole 84 is opened last. As viewed in the circumferential direction of the sleeve 22, the diameters r2 and r3 of the holes 82 and 83 are larger than the diameter r1 and smaller than the diameter r4. Therefore, the gradient of the flow rate of the fluid in an intermediate period between the period in which the open area of the circular hole 81 increases and the period in which the open area of the circular hole 84 increases can be set more easily to a gradient between the gradients in these periods.

In the second valve section 32, the circular holes 86 are formed in the same position as the circular holes 85 in the axial direction. Therefore, when the corresponding diameter reduced portion of the spool 21 moves from a position corresponding to the second ports 27B toward the first ports 26B in a state in which the first ports 26B are closed by the spool 21, the circular holes 85 and the circular holes 86 start to open simultaneously. Therefore, the gradient of the flow rate of the fluid can be increased in a period in which both the open area of each circular hole 85 and the open area of each circular hole 86 increase; namely, in the period when the first ports 26B start to open.

The diameter r6 of the circular holes 86 is larger than the diameter r5 of the circular holes 85. Therefore, when the corresponding diameter reduced portion of the spool 21 moves further from the position corresponding to the second ports 27B toward the first ports 26B, the circular holes 85 are fully opened, and only the open area of each circular hole 86 increases. Therefore, the gradient of the flow rate of the fluid can be set more easily to be smaller than that in the period in which both the open area of each circular hole 85 and the open area of each circular hole 86 increase. Therefore, in the spool valve 11 which changes the gradient of the flow rate from a third gradient to a fourth gradient smaller than the third gradient, the length of the sleeve 22 necessary to secure a predetermined target flow rate can be shortened. Notably, an action and an effect similar to those described above can be obtained when the corresponding diameter reduced portion of the spool 21 moves from a position corresponding to the first ports 26B toward the second ports 27B in a state in which the second ports 27B are closed by the spool 21.

The plurality of first ports 26A (26C) is formed at different positions in the circumferential direction of the sleeve 22. Therefore, the fluid can flow between the space inside the sleeve 22 and the space outside the sleeve 22 through the plurality of first ports 26A (26C). The spool valve 11 has the valve body 23 in which the sleeve 22 is disposed. The valve body 23 has the annular first body circumferential groove 41A (41C) through which the plurality of first ports 26A (26C) communicates with one another, and the first body through hole 39A (39C) through which the first body circumferential groove 41A (41C) communicates with the space outside the valve body 23. Therefore, the fluid can flow between the plurality of first ports 26A (26C) and the space outside the valve body 23 through the annular first body circumferential groove 41A (41C) and the first body through hole 39A (39C). Accordingly, it is possible to facilitate the flow of the fluid between the space inside the sleeve 22 and the space outside the valve body 23 while increasing the maximum flow rate of the fluid flowing through the spool valve 11.

The plurality of second ports 27A (27C) is formed at different positions in the circumferential direction of the sleeve 22. Therefore, the fluid can flow between the space inside the sleeve 22 and the space outside the sleeve 22 through the plurality of second ports 27A (27C). The valve body 23 has the annular second body circumferential groove 51A (51C) through which the plurality of second ports 27A (27C) communicates with one another, and the second body through hole 59A (59C) through which the second body circumferential groove 51A (51C) communicates with the space outside the valve body 23. Therefore, the fluid can flow between the plurality of second ports 27A (27C) and the space outside the valve body 23 through the annular second body circumferential groove 51A (51C) and the second body through hole 59A (59C). Accordingly, it is possible to facilitate the flow of the fluid between the space inside the sleeve 22 and the space outside the valve body 23 while increasing the maximum flow rate of the fluid flowing through the spool valve 11.

One valve section is formed by combining the first ports 26A (26C) and the second port 27A (27C). Therefore, the flow rate of one type of fluid can be controlled by one valve section. The spool valve 11 includes a plurality of valve sections juxtaposed in the axial direction; i.e., the first valve section 31, the second valve section 32, and the third valve section 33. The spool 21 has the diameter reduced portions 43A, 43B, and 43C for the first valve section 31, the second valve section 32, and the third valve section 33. Therefore, the spool valve 11 can control the flow rates of a plurality type of fluids by using the single spool 21.

Each of the first valve section 31 and the third valve section 33 can change the gradient of flow rate from the first gradient to the second gradient larger than the first gradient. Meanwhile, the second valve section 32 can change the gradient of flow rate from the third gradient to the fourth gradient smaller than the third gradient. Therefore, in the case where communication is established between the second ports 27A (27C) of the first valve section 31 (the third valve section 33) and the second ports 27B of the second valve section 32 so as to use the spool valve 11 as a mixing valve, the flow rate of the fluid mixture can be made approximately constant. Also, the spool valve 11 may be used as a distribution valve by reversing the flow direction of the fluid in the above-described mixing valve of one or more embodiments.

Notably, the above-described embodiments may be modified as follows. In the following description, portions identical with those of the above-described embodiments will be denoted by the same reference numerals, and their descriptions will not be repeated.

It is possible to employ a structure in which a clearance is provided between the inner circumferential surface of the sleeve 22 and the outer circumferential surface of the closing portion 42, and the fluid flows through the clearance and the holes 81 to 84 when the control command value is 0%.

Although it is desired that the total flow rate of the fluids discharged from the spool valve 11 be constant irrespective of the control command value, the total flow rate may slightly change in accordance with the control command value. Also, in the case where the differential pressure between the fluid supply side and the fluid discharge side of the spool valve 11 is constant and the total flow rate of the fluid slightly change in accordance with the control command value, the total flow rate of the fluids can be maintained at a constant rate irrespective of the control command value by controlling the differential pressure.

It is possible to employ a structure in which the flow rate of the cooling fluid (COLD) is adjusted by the third valve section 33, the flow rate of the circulating fluid (BYP) is adjusted by the second valve section 32, and the flow rate of the heating fluid (HOT) is adjusted by the first valve section 31.

In the above-described embodiments, the sleeve 22 has the grooves 74 which are formed at positions adjacent to the sleeve circumferential grooves and into which seal members such as O-rings are fitted. Instead of the grooves 74, grooves into which seal members such as O-rings are fitted may formed in the valve body 23 at positions corresponding to the grooves 74.

The first body through holes 39A, 39B, and 39C may be connected to the first ports 26A, 26B, and 26C, respectively, without intervention of the first sleeve circumferential grooves 36A, 36B, and 36C. Namely, the above-described embodiments may be modified such that the first body circumferential grooves 41A, 41B, and 41C are formed, and the first sleeve circumferential grooves 36A, 36B, and 36C are omitted. Alternatively, the above-described embodiments may be modified such that the first body circumferential grooves 41A, 41B, and 41C are omitted, and the first sleeve circumferential grooves 36A, 36B, and 36C are formed.

Figure 8:
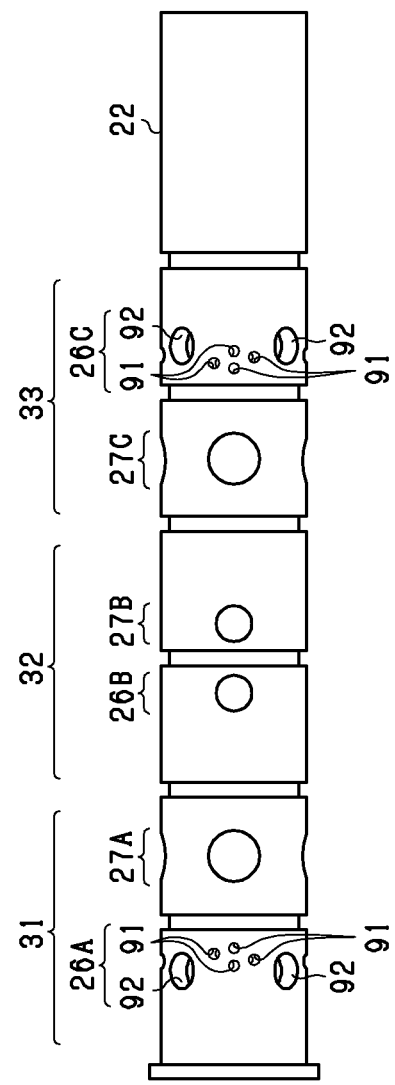
FIG. 8 is a side view showing modifications of the sleeve according to one or more embodiments.

As shown in FIG. 8, each of the first ports 26A and 26C includes a plurality of circular holes 91 (first through portions) which is through holes, and a circular hole 92 (second through portion) which is a through hole. Therefore, the relation between the movement amount of the spool 21 and the flow rate increase amount at the time when the first ports 26A or 26C start to open can be easily set by adjusting the number of the circular holes 91. The positions of the circular holes 91 in the axial direction differ from one another. Therefore, it is possible to decrease the number of the circular holes 91 which are located near the diameter reduced portions 43A and 43C of the spool 21 in a state in which the first ports 26A and 26C are closed, whereby the amount of the fluid leaked from the gap between the inner circumferential surface of the sleeve 22 and the outer circumferential surface of the spool 21 can be reduced.

Figure 9:
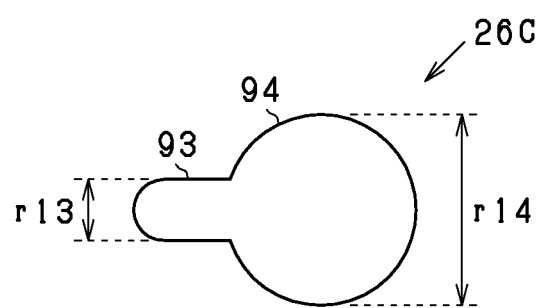
FIG. 9 is a schematic view showing modifications of a port according to one or more embodiments.

As shown in FIG. 9, each of the first ports 26C (26A) may include an elongated circular hole portion 93 and a circular hole portion 94 which are through holes. The elongated circular hole portion 93 (first through portion) is an elongated circular hole having a diameter r13 in the circumferential direction of the sleeve 22 and a diameter larger than the diameter r13 in the axial direction of the sleeve 22. The circular hole portion 94 (second through portion) is a circular hole having a diameter r14 larger than the diameter r13 in the circumferential direction and the axial direction of the sleeve 22. In the circumferential direction of the sleeve 22, the center position of the elongated circular hole portion 93 and the center position of the circular hole portion 94 coincide with each other. In the axial direction of the sleeve 22, a range in which the elongated circular hole portion 93 is present and a range in which the circular hole portion 94 is present partially overlap each other. Therefore, the elongated circular hole portion 93 and the circular hole portion 94 are connected to each other. Even when each of the first ports 26C (26A) has such a shape, an action and an effect similar to those of the above-described embodiments can be yielded. Notably, the circular hole portion 94 may be an elongated circular hole having the diameter r14 in the circumferential direction of the sleeve 22 and a diameter larger than the diameter r14 in the axial direction of the sleeve 22.

Figure 10:
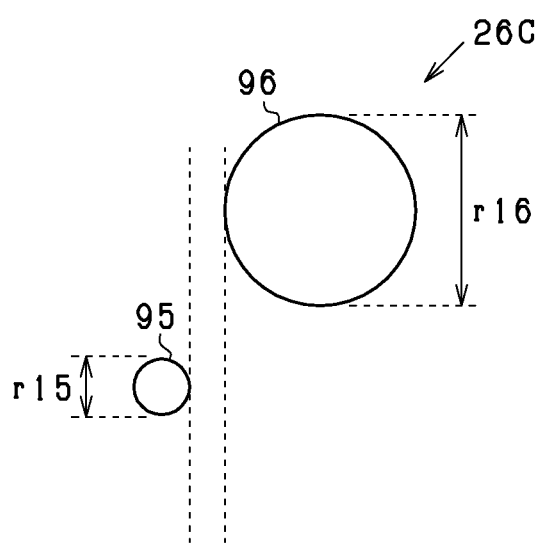
FIG. 10 is a schematic view showing modifications of the port according to one or more embodiments.

As shown in FIG. 10, each of the first ports 26C (26A) may include a circular hole 95 and a circular hole 96. The circular hole 95 (first through portion) has a diameter r15 in the circumferential direction and the axial direction of the sleeve 22. The circular hole 96 (second through portion) has a diameter r16 larger than the diameter r15 in the circumferential direction and the axial direction of the sleeve 22. In the circumferential direction of the sleeve 22, the center position of the circular hole 95 and the center position of the circular hole 96 differ from each other. In the axial direction of the sleeve 22, a range in which the circular hole is present and a range in which the circular hole 96 is present do not overlap each other. Even when each of the first ports 26C (26A) has such a shape, an action and an effect similar to those of the above-described embodiments can be yielded, except that the speed of increase of the open area of each first port 26C drops temporarily after having increased.

The elongated circular hole is not limited to an elongated circular hole whose major axis extends along the axial direction and may be an elongated circular hole whose minor axis extends along the axial direction. In this case, the flow rate increase amount with respect to the movement amount of the spool 21 (the gradient of flow rate) can be increased. Also, the elongated circular hole is not limited to a racetrack-shaped hole whose cross section has semicircular portions and a rectangular portion therebetween and may be an elliptical hole.

Figure 11:
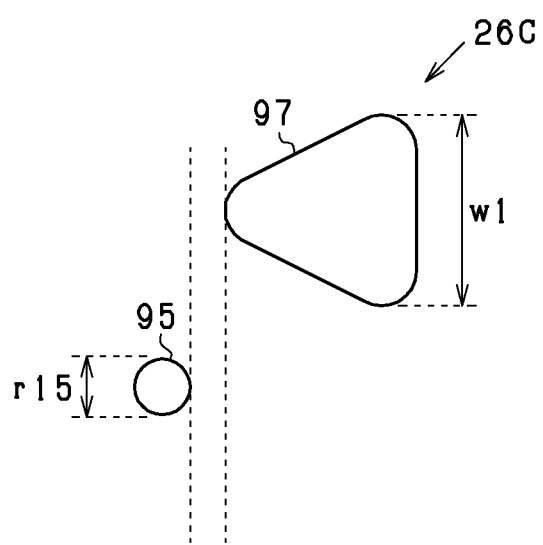
FIG. 11 is a schematic view showing still modifications of the port according to one or more embodiments.

As shown in FIG. 11, each of the first ports 26C (26A) may include the circular hole 95 and a triangular hole 97. The circular hole 95 (first through portion) has the diameter r15 in the circumferential direction and the axial direction of the sleeve 22. The triangular hole 97 (second through portion) which is a through hole has a width w1 larger than the diameter r15 in the circumferential direction of the sleeve 22. One side of the triangular hole 97 extends in the circumferential direction of the sleeve 22, and the triangular hole 97 has rounded corners. The side of the triangular hole 97 extending in the circumferential direction of the sleeve 22 is most remote from the circular hole 95. In the circumferential direction of the sleeve 22, the center position of the circular hole 95 and the centroid of the triangular hole 97 differ from each other. In the axial direction of the sleeve 22, a range in which the circular hole 95 is present and a range in which the triangular hole 97 is present do not overlap each other. Even when each of the first ports 26C (26A) has such a shape, an action and an effect similar to those of the above-described embodiments can be yielded, except that the speed of increase of the open area of each first port 26C drops temporarily after having increased. Notably, in the axial direction of the sleeve 22, the range in which the circular hole 95 is present and the range in which the triangular hole 97 is present may overlap each other. Also, the circular hole 95 may be replaced with a triangular hole, and the triangular hole 97 may be replaced with a circular hole or an elongated circular hole. Namely, it is possible to employ a structure in which at least one of the first through portion and the second through portion is a triangular hole whose one side extends in the circumferential direction of the sleeve 22 and which has rounded corners. Also, the first through portion and/or the second through portion may be a polygonal hole (a polygonal through hole) other than a triangular hole. Notably, desirably, the corners of the polygonal hole are rounded.

Only one first port 26A (26C) may be formed in the sleeve 22 as viewed in the circumferential direction of the sleeve 22. In such a case, the first sleeve circumferential groove 36A (36C) and the first body circumferential groove 41A (41C) are omitted, and the first port 26A (26C) is connected to the first body through hole 39A (39C).

Only one second port 27A (27C) may be formed in the sleeve 22 as viewed in the circumferential direction of the sleeve 22. In such a case, the second sleeve circumferential groove 56A (56C) and the second body circumferential groove 51A (51C) are omitted, and the second port 27A (27C) is connected to the second body through hole 59A (59C).

The spool valve of one or more embodiments may be realized as a spool valve including at least one of the first to third valve sections 31 to 33.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A spool valve comprising:
a cylindrical tubular sleeve that extends in an axial direction and comprises a supply port and a discharge port disposed apart from each other in the axial direction, wherein
the supply port comprises a first through hole having a first width in a circumferential direction of the sleeve and a second through hole having a second width different from the first width in the circumferential direction; and
a cylindrical columnar spool that:
extends in the axial direction,
slides inside the cylindrical tubular sleeve, and
comprises an outer surface and a diameter-reduced portion that forms a communication passage, wherein
the cylindrical columnar spool slides to open and close the supply port,
the supply port communicates with the discharge port through the communication passage only when opened, and
at least one of the first through hole and the second through hole is a triangular hole that has a side extending in the circumferential direction and has a rounded corner.

2. A spool valve according to claim 1, wherein
the first through hole is a circular hole or an elongated circular hole that has a first diameter, as the first width, in the circumferential direction, and
the second through hole is a circular hole or an elongated circular hole that has a second diameter, as the second width different from the first diameter, in the circumferential direction.

3. A spool valve according to claim 1, wherein the second through hole is farther away from the discharge port in the axial direction than the first through hole, and the second width is larger than the first width.

4. A spool valve according to claim 3, wherein the supply port comprises a plurality of the first through holes formed at different positions in the axial direction.

5. A spool valve according to claim 4, wherein
the supply port comprises a third through hole that is formed at a position between the first through hole and the second through hole in the axial direction and that has a third width in the circumferential direction, and
the third width is larger than the first width and smaller than the second width.

6. A spool valve according to claim 1, wherein the second through hole is formed at the same position as the first through hole in the axial direction, and the second width is larger than the first width.

7. A spool valve comprising:
a cylindrical tubular sleeve that extends in an axial direction and comprises a supply port and a discharge port disposed apart from each other in the axial direction, wherein
the supply port comprises a first through hole having a first width in a circumferential direction of the sleeve, and a second through hole having a second width different from the first width in the circumferential direction; and
a cylindrical columnar spool that:
extends in the axial direction,
slides inside the cylindrical tubular sleeve, and
comprises an outer surface and a diameter-reduced portion that forms a communication passage, wherein
the cylindrical columnar spool slides to open and close the supply port,
the supply port communicates with the discharge port through the communication passage only when opened,
the second through hole is farther away from the discharge port in the axial direction than the first through hole, and the second width is larger than the first width, and
the first through hole overlaps the second through hole when viewed from in the axial direction but does not overlap the second through hole when viewed in the circumferential direction.

8. A spool valve according to claim 7, wherein the first through hole and the second through hole are formed at respective positions where the first through hole and the second through hole do not overlap each other in the circumferential direction.

9. A spool valve according to claim 8, wherein the supply port comprises a plurality of the first through holes formed at different positions in the axial direction.

10. A spool valve according to claim 8, wherein
the supply port comprises a third through hole that is formed at a position between the first through hole and the second through hole in the axial direction and that has a third width in the circumferential direction, and
the third width is larger than the first width and smaller than the second width.

11. A spool valve according to claim 7, wherein the supply port comprises a plurality of the first through holes formed at different positions in the axial direction.

12. A spool valve according to claim 7, wherein
the supply port comprises a third through hole that is formed at a position between the first through hole and the second through hole in the axial direction and that has a third width in the circumferential direction, and
the third width is larger than the first width and smaller than the second width.

13. A spool valve comprising:
a cylindrical tubular sleeve that extends in an axial direction and comprises a supply port and a discharge port disposed apart from each other in the axial direction, wherein
the supply port comprises a first through hole having a first width in a circumferential direction of the sleeve, and a second through hole having a second width different from the first width in the circumferential direction; and
a cylindrical columnar spool that:
extends in the axial direction,
slides inside the cylindrical tubular sleeve, and
comprises an outer surface and a diameter-reduced portion that forms a communication passage, wherein
the cylindrical columnar spool slides to open and close the supply port,
the supply port communicates with the discharge port through the communication passage only when opened,
the second through hole is farther away from the discharge port in the axial direction than the first through hole, and the second width is larger than the first width, and when the diameter-reduced portion moves in the axial direction from a position corresponding to the discharge port toward the supply port to the maximum distance, an opened area of the second through hole that is not closed with the outer surface is not greater than a half of an entire area of the second through hole.

14. A spool valve comprising:
a cylindrical tubular sleeve that extends in an axial direction and comprises a supply port and a discharge port disposed apart from each other in the axial direction, wherein
   the supply port comprises a first through hole having a first width in a circumferential direction of the sleeve, and a second through hole having a second width different from the first width in the circumferential direction; and
a cylindrical columnar spool that:
   extends in the axial direction,
   slides inside the cylindrical tubular sleeve, and
   comprises an outer surface and a diameter-reduced portion that forms a communication passage, wherein
the cylindrical columnar spool slides to open and close the supply port,
the supply port communicates with the discharge port through the communication passage only when opened,
the second through hole is farther away from the discharge port in the axial direction than the first through hole, and the second width is larger than the first width,
the supply port comprises a third through hole that is formed at a position between the first through hole and the second through hole in the axial direction and that has a third width in the circumferential direction, and
the third width is larger than the first width and smaller than the second width.

15. A spool valve comprising:
a cylindrical tubular sleeve that extends in an axial direction and comprises a supply port and a discharge port disposed apart from each other in the axial direction, wherein
   the supply port comprises a first through hole having a first width in a circumferential direction of the sleeve, and a second through hole having a second width different from the first width in the circumferential direction; and
a cylindrical columnar spool that:
   extends in the axial direction,
   slides inside the cylindrical tubular sleeve, and
   comprises an outer surface and a diameter-reduced portion that forms a communication passage, wherein
the cylindrical columnar spool slides to open and close the supply port,
the supply port communicates with the discharge port through the communication passage only when opened, and
the spool valve further comprises:
   a plurality of the supply ports including the supply port, wherein the supply ports are formed at different positions in the circumferential direction; and
   a valve body in which the sleeve is disposed, wherein the valve body has an annular first groove through which the supply ports communicate with one another and a first body through hole through which the first groove communicates with a space outside the valve body.

16. A spool valve according to claim 15, further comprising:
a plurality of the discharge ports including the discharge port, wherein the discharge ports are formed at different positions in the circumferential direction, wherein
the valve body has an annular second groove through which the discharge ports communicate with one another and a second body through hole through which the second groove communicates with the space outside the valve body.

17. A spool valve comprising:
a cylindrical tubular sleeve that extends in an axial direction and comprises a supply port and a discharge port disposed apart from each other in the axial direction, wherein
   the supply port comprises a first through hole having a first width in a circumferential direction of the sleeve, and a second through hole having a second width different from the first width in the circumferential direction; and
a cylindrical columnar spool that:
   extends in the axial direction,
   slides inside the cylindrical tubular sleeve, and
   comprises an outer surface and a diameter-reduced portion that forms a communication passage, wherein
the cylindrical columnar spool slides to open and close the supply port,
the supply port communicates with the discharge port through the communication passage only when opened, and
the spool valve further comprises:
   a first valve section and a second valve section juxtaposed in the axial direction, wherein each of the first valve section and the second valve section includes the supply port and the discharge port, wherein
   in the first valve section, the second through hole is formed at a position more remote from the discharge port than the first through hole in the axial direction, and the second width is larger than the first width,
   in the second valve section, the second through hole is formed at the same position as the first through hole in the axial direction, and the second width is larger than the first width, and
   the diameter-reduced portion is individually formed on the cylindrical columnar spool for each of the first valve section and the second valve section.

* * * * *